(12) United States Patent
Poole (10) Patent No.: US 10,330,219 B2
(45) Date of Patent: Jun. 25, 2019

(54) MICRO-VALVE

(71) Applicant: Redd & Whyte Limited, Greater London (GB)

(72) Inventor: Roger Poole, Bury St. Edmonds (GB)

(73) Assignee: REDD & WHYTE LIMITED, London (GB)

( * ) Notice: Subject to any disclaimer, the term of this patent is extended or adjusted under 35 U.S.C. 154(b) by 0 days.

(21) Appl. No.: 15/029,257

(22) PCT Filed: Oct. 10, 2014

(86) PCT No.: PCT/GB2014/053059
§ 371 (c)(1),
(2) Date: Apr. 14, 2016

(87) PCT Pub. No.: WO2015/055986
PCT Pub. Date: Apr. 23, 2015

(65) Prior Publication Data
US 2016/0258551 A1    Sep. 8, 2016

(30) Foreign Application Priority Data

Oct. 14, 2013  (GB) .................................. 1318155.7

(51) Int. Cl.
*F16K 99/00* (2006.01)
*F16K 31/06* (2006.01)

(52) U.S. Cl.
CPC ...... *F16K 99/0046* (2013.01); *F16K 31/0651* (2013.01); *F16K 31/0665* (2013.01); *F16K 99/0005* (2013.01); *F16K 2099/0086* (2013.01); *F16K 2099/0092* (2013.01)

(58) Field of Classification Search
CPC ............ F16K 99/0046; F16K 99/0005; F16K 99/0003; F16K 99/0001; F16K 2099/0086; F16K 2099/0092; F16K 31/0651; F16K 31/0655; F16K 31/0665
USPC ........................................ 251/129.15, 129.21
See application file for complete search history.

(56) References Cited

U.S. PATENT DOCUMENTS

| | | | | | |
|---|---|---|---|---|---|
| 2,619,116 | A | * | 11/1952 | Ralston | ................... F16K 23/00 137/561 R |
| 3,231,233 | A | * | 1/1966 | Herion | ..................... B01J 23/70 251/129.21 |
| 3,523,676 | A | * | 8/1970 | Barker | ................ F16K 31/0658 251/129.05 |
| 3,817,491 | A | * | 6/1974 | Burckhardt | ............. B60T 8/363 251/129.21 |

(Continued)

FOREIGN PATENT DOCUMENTS

EP    0704649 A2    4/1996

OTHER PUBLICATIONS

"Introducing BANTAM Mini Compression Springs" by Lee Spring (Publicly Available on the Internet since at least Dec. 2010. http://www.leespring.com/uk_int_learn_bantam.asp).*

(Continued)

*Primary Examiner* — Reinaldo Sanchez-Medina
*Assistant Examiner* — David Colon-Morales
(74) *Attorney, Agent, or Firm* — Reising Ethington P.C.

(57) ABSTRACT

A micro-valve comprises a floating armature, wherein the floating armature is within a fluid flow path through the valve and comprises three or more channels extending along the armature in the direction of fluid flow.

18 Claims, 5 Drawing Sheets

(56) References Cited

U.S. PATENT DOCUMENTS

| | | | | |
|---|---|---|---|---|
| 3,833,015 | A | | 9/1974 | Kneuer |
| 4,483,485 | A | * | 11/1984 | Kamiya ............. F02M 51/0653 |
| | | | | 239/585.4 |
| 4,790,513 | A | * | 12/1988 | Davis ................. F16K 31/0606 |
| | | | | 137/625.65 |
| 4,915,350 | A | * | 4/1990 | Babitzka ............ F02M 51/0614 |
| | | | | 239/585.4 |
| 5,232,167 | A | * | 8/1993 | McCormick ....... F02M 51/0671 |
| | | | | 239/585.1 |
| 5,277,400 | A | * | 1/1994 | Bierther .................. B05C 5/001 |
| | | | | 239/585.1 |
| 5,348,224 | A | * | 9/1994 | Consadori ........... F16K 31/0651 |
| | | | | 236/20 R |
| 5,358,215 | A | * | 10/1994 | Buth .................. B60G 17/0525 |
| | | | | 251/129.15 |
| 5,360,197 | A | * | 11/1994 | Reiter .................... F02M 61/20 |
| | | | | 239/585.4 |
| 5,606,992 | A | * | 3/1997 | Erickson ............. F16K 31/0665 |
| | | | | 137/596.17 |
| 5,704,587 | A | * | 1/1998 | Kuromitsu .............. B60T 8/363 |
| | | | | 251/129.15 |
| 5,716,010 | A | * | 2/1998 | Tada ................... F02M 51/0671 |
| | | | | 239/124 |
| 5,743,960 | A | * | 4/1998 | Tisone .................. B01L 3/0265 |
| | | | | 118/305 |
| 5,769,391 | A | * | 6/1998 | Noller ................... F02M 51/061 |
| | | | | 239/585.4 |
| 5,820,031 | A | * | 10/1998 | Reiter ................ F02M 51/0671 |
| | | | | 239/585.1 |
| 5,848,780 | A | | 12/1998 | Miller et al. |
| 5,875,975 | A | * | 3/1999 | Reiter ................ F02M 51/0682 |
| | | | | 239/533.3 |
| 5,924,674 | A | * | 7/1999 | Hahn ................. F02M 51/0614 |
| | | | | 251/129.01 |
| 5,975,436 | A | * | 11/1999 | Reiter .................. F02M 61/168 |
| | | | | 239/533.9 |
| 6,026,847 | A | * | 2/2000 | Reinicke ............. F16K 31/0624 |
| | | | | 137/487.5 |
| 6,068,010 | A | * | 5/2000 | Reinicke .................. B64G 1/26 |
| | | | | 137/1 |
| 6,317,978 | B2 | * | 11/2001 | Reiter ................ F02M 51/0682 |
| | | | | 251/129.21 |
| 6,446,885 | B1 | * | 9/2002 | Sims, Jr. ............... F02M 61/165 |
| | | | | 239/585.4 |
| 6,537,505 | B1 | * | 3/2003 | LaBudde ............ F16K 31/0651 |
| | | | | 222/504 |
| 6,648,298 | B2 | * | 11/2003 | Souma ................. F02M 51/061 |
| | | | | 123/472 |
| 6,834,667 | B2 | * | 12/2004 | Sumiya .............. F02M 51/0671 |
| | | | | 137/15.18 |
| 6,899,314 | B2 | * | 5/2005 | Ott ...................... F16K 31/0606 |
| | | | | 251/129.14 |
| 6,994,234 | B2 | * | 2/2006 | de Leeuw ............ B05C 5/0225 |
| | | | | 222/1 |
| 6,994,308 | B1 | * | 2/2006 | Wang .................... F16K 31/408 |
| | | | | 251/129.21 |
| 7,086,245 | B2 | * | 8/2006 | Yee .......................... F15C 5/00 |
| | | | | 236/92 B |
| 7,131,632 | B2 | * | 11/2006 | Kish, Jr. ............... F16K 27/003 |
| | | | | 251/129.15 |
| 7,163,026 | B2 | * | 1/2007 | Takeda ...................... F15C 5/00 |
| | | | | 137/38 |
| 7,182,311 | B2 | * | 2/2007 | Kimble ............... F16K 31/0655 |
| | | | | 251/129.21 |
| 8,071,057 | B2 | * | 12/2011 | Tokita .................. B01J 19/0093 |
| | | | | 422/417 |
| 8,991,784 | B2 | * | 3/2015 | Jurgens ................ B05C 5/0225 |
| | | | | 137/315.03 |
| 9,004,447 | B2 | * | 4/2015 | Tung ..................... F16K 27/029 |
| | | | | 251/129.21 |
| 2002/0117644 | A1 | * | 8/2002 | Carrillo ............... F16K 31/0651 |
| | | | | 251/129.08 |
| 2002/0134958 | A1 | * | 9/2002 | Migliori ............. F16K 31/0655 |
| | | | | 251/129.15 |
| 2005/0224739 | A1 | * | 10/2005 | Kish, Jr. ............. F16K 31/0655 |
| | | | | 251/129.17 |
| 2006/0118748 | A1 | * | 6/2006 | Franco-Sola ....... F16K 31/0651 |
| | | | | 251/129.21 |
| 2007/0251589 | A1 | * | 11/2007 | Kaji .......................... F15C 5/00 |
| | | | | 137/625.48 |
| 2007/0291581 | A1 | | 12/2007 | Ehrfeld et al. |
| 2008/0061170 | A1 | * | 3/2008 | Kimura .............. F02M 51/0632 |
| | | | | 239/585.1 |
| 2008/0249510 | A1 | * | 10/2008 | Mescher ........... A61M 5/14276 |
| | | | | 604/890.1 |
| 2009/0121541 | A1 | | 5/2009 | Lee et al. |
| 2013/0001451 | A1 | | 1/2013 | Alaze |

OTHER PUBLICATIONS

International Search Report for Patent Cooperation Treaty App. No. PCT/GB2014/053059 filed on Oct. 10, 2014, dated Jan. 12, 2015.
Search Report for GB1318155.7 dated Nov. 4, 2013.
Search Report for GB1318155.7 dated Jan. 8, 2014.

* cited by examiner

MICRO-VALVE

CROSS-REFERENCE TO RELATED APPLICATIONS

This application is a 371 national phase U.S. non-provisional patent application, which claims the benefit of priority from Patent Cooperation Treaty International Patent Application Number PCT/GB2014/053059 filed on Oct. 10, 2014, and GB Patent Application No. 1318155.7 filed on Oct. 14, 2013, the entire disclosures of which are incorporated herein.

FIELD

This invention relates to micro-valves, and in particular improving the precision and responsiveness of micro-valves.

BACKGROUND

Micro-valves are used to dispense small amounts of fluid, typically in the range of 1 nl to 1 ml. Accurately knowing the volume of liquid that has been dispensed is important in various industries, such as the pharmaceutical industry, the production of ink-jet printers and in various nanotechnology applications, including but not limited to 3D cell printing. In these applications, the fluid being dispensed is often high value, and it is often necessary to repeatedly perform the same dispensing operation many times. As a result, it is important for micro-valves to be able to dispense precisely, accurately and quickly.

Conventional micro-valves have used solenoid and spring actuation methods. A solenoid with an ancillary electromagnetic coil fitted can be used to induce a magnetic field by inducing an electromagnetic field around both a floating, or unfixed, armature and a fixed armature within the valve, causing them to attract each other—this is the same effect as two magnets being attracted together. This causes the floating armature to move, and thus to open the valve. Thereafter, when the solenoid is switched off by turning off the electrical current, the magnetic field is released. A spring, that was compressed during the opening of the valve, is then used to return the floating armature to its original position and thus close the valve.

However, this arrangement can lead to turbulence within the valve. The floating armature is typically positioned within the fluid path through the valve, thereby at least partially obstructing the fluid flow. The irregular shape of the floating armature (often a cylinder with portions sliced away from opposite sides) can lead to turbulence being induced within the micro-valve, which can lead to inaccurate dispensing. Such irregular shapes can have the effect, when an electromagnetic induced field is applied, to randomly rotate such an armature each and every time it is switched on and off, such random rotation will create fluid turbulence. Also, the spring is conventionally positioned within the direct fluid path. Once again, the spring can act as an obstacle in the fluid path and thus introduce turbulence. This can be especially problematic because the spring is conventionally in the valve head, near the valve outlet, and so the induced turbulence is not dissipated before the fluid reaches the outlet.

The present invention aims to at least partially solve these problems by providing an alternative micro-valve construction.

US 2009/0121541 discloses a solenoid valve for a brake system. U.S. Pat. No. 5,704,587 discloses an electromagnetic valve device. Both are examples of the systems discussed above, in which a spring for opening a valve is within the direct fluid path, between the floating armature and the valve outlet.

US 2007/0291581 discloses a micromixer. A spring is used to adjust the pressure difference required to actuate a plunger in the disclosed micromixer. The micromixer operates in a significantly different manner to microvalve. The force to overcome the spring is provided by a pressure difference within the bores of the micromixer, rather than by electromagnetism.

SUMMARY

According to a first aspect of the invention, there is provided a micro-valve comprising a floating armature, wherein the floating armature is within a fluid flow path through the valve and comprises three or more channels extending along the armature in the direction of fluid flow.

The provision of the channels provides the armature with a 'fluted' appearance. The channels increase the hydraulic diameter inside the valve, and thus helps reduce turbulence and encourage laminar flow. Also, by dividing the flow into three or more channels, sections of the fluid are effectively isolated from each other, thus restricting the formation of large eddies. This construction helps reduce internal turbulence, improves flow and thus improves the responsiveness and performance of the micro-valve. As a result a more consistent and predictable flow through and out of the valve is obtained, which enables greater precision when dispensing fluid with the valve.

The micro-valve can further comprise a fixed armature within the flow path of the fluid, which comprises three or more channels corresponding in number and size to the channels on the floating armature. In the same way as for the floating armature, this assists in producing a laminar, even and predictable flow of fluid through the valve.

The channels can be arranged to be equidistant around the armature or armatures. This assists in producing an even, stable flow.

The presence of the channels creates lobes on the armature(s). The presence of multiple lobes assists with stabilising the floating armature, reducing fluid fluttering.

The floating armature can at least partially taper in the direction of fluid flow through the valve. Preferably the front end of the armature is tapered to encourage a gentle transition in flow towards the outlet of the valve.

The floating armature can have a maximum radius of 1.5 mm or less, optionally a maximum radius of 1.1 mm or less. The channels can have a maximum depth of at least 0.4 mm. The micro-valve can have a housing surrounding at least the floating armature, wherein the clearance of the housing from the widest point of the floating armature is 0.100 mm or less, preferably 0.075 mm or less.

The micro-valve can further comprise an electromagnetic coil for inducing a magnetic field in the armature(s), thereby causing the floating armature to move. The action of the electromagnetic coil on the armature can cause the valve to open or close, and can be opposed by a spring for returning the armature into position when the electromagnetic coil is deactivated.

The micro-valve can further comprise: a valve seat; and a valve ball; wherein the valve ball is connected to the floating armature, such that movement of the floating armature opens the micro-valve by withdrawing the valve ball from the valve seat and closes the valve by moving the valve ball into the valve seat.

The micro-valve can further comprise: a valve outlet, wherein the outlet has a diameter of 1.2 mm or less, preferably 1 mm or less and most preferably 0.2 mm or less. The outlet can be detachable from the valve. As such, the same valve can be used with different outlets to allow greater flexibility and precision in the quantities of fluid dispensed by the valve.

The floating armature can be configured to move up to 0.5 mm when actuated by the electromagnetic coil, preferably 0.3 mm or less and more preferably 0.2 mm or less. This area is known as the pinch point or closure point between the fixed and floating armatures. The channels are parallel to an axis of rotational symmetry of the floating armature.

The micro-valve can comprise: a spring arranged between the floating armature and the fixed armature. The spring can act against a recess on the floating armature, the recess being deeper than the three or more channels. As a result, the spring is kept out, or at least partially kept out, of the direct fluid flow. That is, the spring is not located in the flow path around the armatures, or at least part of the spring coil is located inside the flow path. The spring is recessed so that fluid can flow past the armatures with needing to flow around the spring, without needing to flow directly through the spring.

According to another aspect of the invention, there is provided a micro-valve comprising:

a floating armature; a fixed armature; and a spring arranged to be compressed between the floating armature and the fixed armature.

According to this aspect, the position of the spring between the armatures reduces the amount of turbulence caused in the fluid exiting the valve, because the spring is kept distant from the outlet, and away from the main flow path.

The spring can be arranged to be compressed between the floating armature and the fixed armature. Alternatively, the spring could be used in tension. The spring can have a stiffness/Hooke's constant in the range of 40 to 60 mN/mm, preferably about 50 mN/mm. The spring preferably imparts a force in the range of 0.05 to 0.25 N when in use, preferably from 0.10 to 0.20 N. The spring is preferably pre-compressed, when assembled, such that it pushes with approximately the same force when the valve is open and closed.

According to another aspect of the invention, there is provided a floating armature for use in a micro-valve according to any one of the preceding aspects, wherein the floating armature has an axis of rotational symmetry and comprises three or more channels extending in the direction of the axis of symmetry.

According to another aspect of the invention, there is provided a method of dispensing fluid using a micro-valve, the micro-valve comprising a floating armature having an axis of rotational symmetry, the armature comprising three or more channels extending in the direction of the axis of symmetry; wherein the method comprises: operating the valve to dispense fluid such that fluid passes along the channels of the floating armature.

According to another aspect of the invention, there is provided a method of dispensing fluid using a micro-valve, the method comprising: compressing a spring, arranged between a floating armature and a fixed armature of the micro-valve; releasing the spring, such that it moves the floating armature.

BRIEF DESCRIPTION OF THE DRAWING FIGURES

The invention is described below, by way of example only, with reference to the accompany Figures, in which.

DESCRIPTION OF THE PREFERRED EMBODIMENTS

Figure 1:
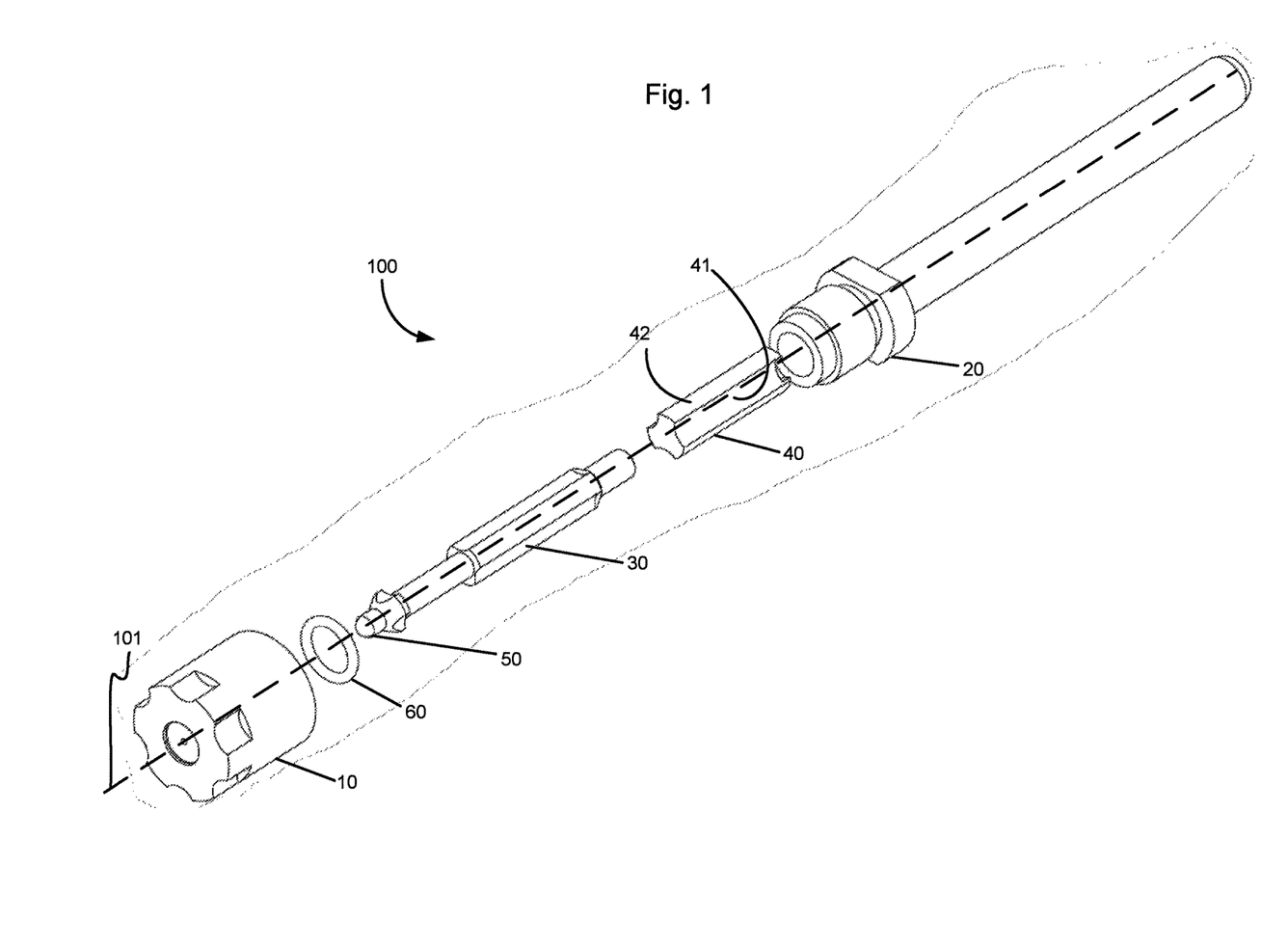
FIG. 1 is a perspective view of a disassembled micro-valve.
Figure 2:
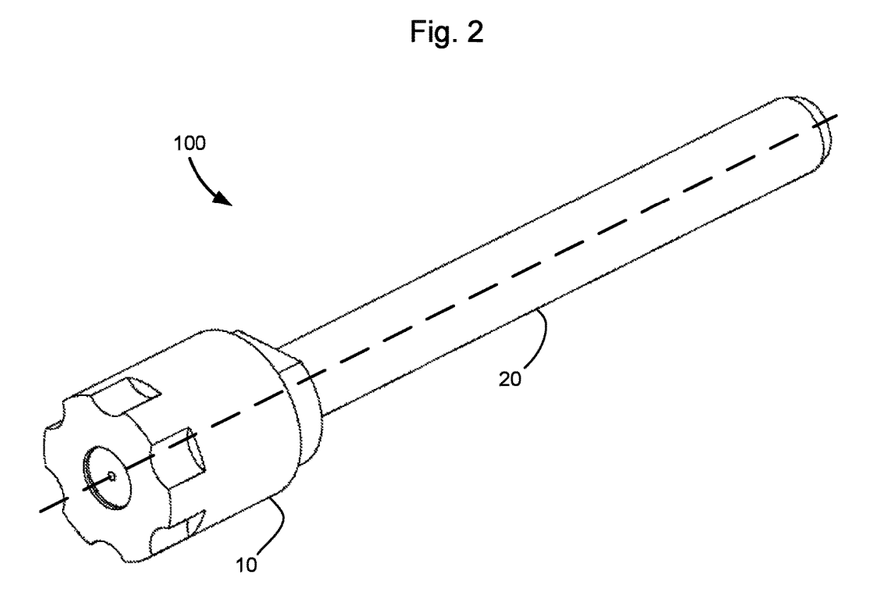
FIG. 2 is a perspective view of the micro-valve of FIG. 1 after it has been assembled.

FIG. 1 shows a perspective view of a disassembled micro-valve 100 according to the present invention. The Figure shows a housing head section 10 that connects to a housing body section 20. The assembled housing can be seen in FIG. 2. FIG. 1 also shows two armatures: a floating, or mobile, armature 30 and a fixed, or stationary, armature 40. The floating armature 30 has a valve ball 50 attached to the end furthest away from the stationary armature 40. The valve ball 50 interacts with a valve seat 11 (shown in FIG. 3) within the head section 10 of the housing. Also shown in FIG. 1 is an O-ring (60) which provides a seal between the head section 10 and the body section 20 when they are assembled. Of course, other methods of sealing can be freely used and the invention is not restricted to the use of an O-ring. FIG. 1 shows a central axis 101 passing through the various components of the micro-valve 100. In the example of FIG. 1, each of the pieces shown has rotational symmetry about axis 101. In the following description, the terms "front" and "back" or "rear" are used with reference to the arrangement in FIG. 1, in which the left-hand side is taken to be the "front".

Figure 3:
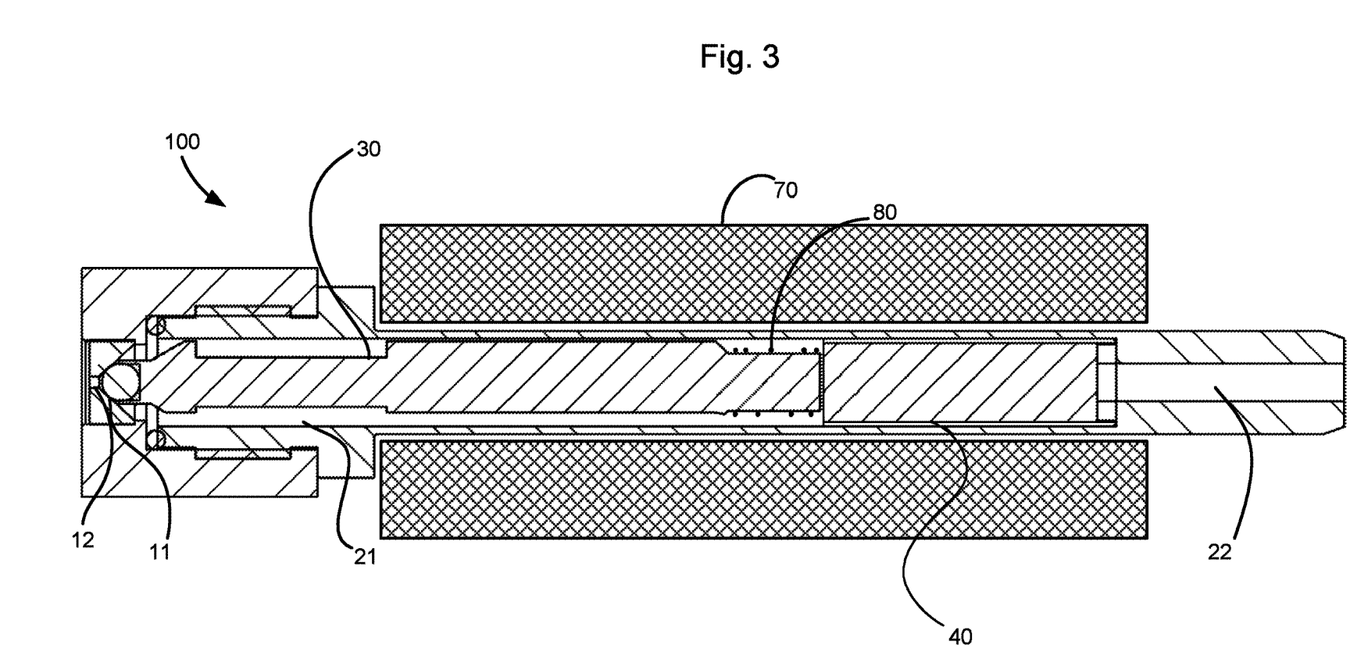
FIG. 3 is a cross-sectional view of the micro-valve of FIG. 2 in combination within an electromagnetic coil.

A feature of the micro-valve 100 not shown in FIG. 1, but shown in FIG. 3, is a spring 80 which fits between the armatures 30 and 40. It can also be seen from FIG. 3 how the micro-valve 100 fits within an electromagnetic coil, 70 that in use induces a magnetic field within the armatures 30 and 40. The term "micro-valve" can be used to refer to the assembly 100 with or without the electromagnetic coil 70.

In order to assemble the micro-valve 100, fixed armature 40 is fitted into body section 20, followed by floating armature 30. The spring 80 can be fitted into the body section 20 after the fixed armature 40, so that the back of the floating armature 30 comes into contact with the spring 80 when it is subsequently fitted into the body section 20. Alternatively, the spring 80 can be fitted onto the back end of the floating armature 30 before feeding the floating armature 30 into the body section 20. The fixed armature 40 can be held in place in the body section 20 of the housing either mechanically (e.g. through an interference fit with the surrounding housing or by a physical fastening means) or chemically (e.g. using an adhesive). In a preferred embodiment, the fixed armature 40 is welded into position.

Figure 4:
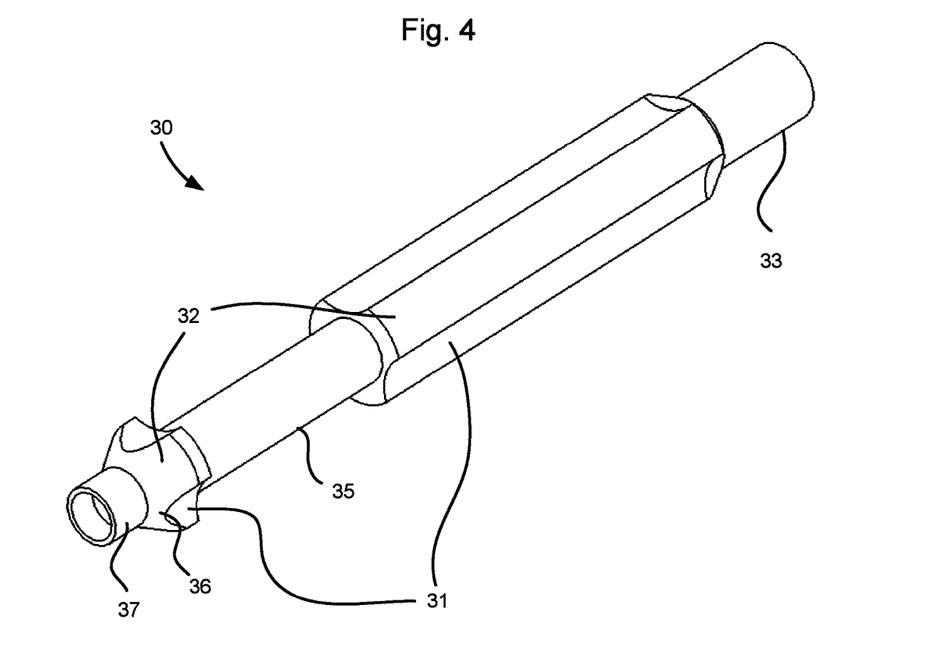
FIG. 4 is a perspective view of the floating armature shown in FIGS. 1 and 3.

As mentioned above, the end of floating armature 30 furthest from fixed armature 40 has the valve ball 50 attached to it. Thus, the valve ball 50 is positioned to be received in the head portion 10 of the housing. The valve ball 50 is positioned within a cup or holder 37 (shown in FIGS. 4 and 5 without the ball 50 present) formed on the front end of the floating armature 30.

O-ring 60 is positioned within head section 10, before head section 10 is connected to body section 20. The O-ring 60 is compressed by the two sections of the housing 10, 20 and thus assists in the creation of seal, to stop any fluid within the valve 100 from leaking out of the housing 10, 20.

Housing head section 10 and body section 20 can be designed to fit together as a snap-fit, or alternatively to screw together (e.g. by providing a set of corresponding screw heads on the end of body section 20 and within head section 10). As such, head section 10 and body section 20 can either be connected in a non-releasable manner, or in a releasable manner that allows the body to be subsequently disassembled.

FIG. 3 shows a cross-section through the assembled micro-valve, including showing how solenoid 70 is positioned around the body section 20 when the micro-valve 100 is ready to use. As mentioned above, FIG. 3 also shows how the spring 80 is positioned between the two armatures 30, 40.

The detail of how the valve ball 50 and valve seat 11 interact is also shown in FIG. 3. Valve seat 11 is formed within the head section 10, but may be manufactured and machined separately to the rest of the head section before subsequently being assembled into the head section 10. The valve ball 50, secured to the end of the floating armature 30, fits into the valve seat 11 so that a seal is produced with the valve seat 11 all the way around the valve ball 50. The shape of the valve seat 11 is typically substantially conical, and may also include sections that are curved to compliment the shape of the valve ball 50, in order to provide a larger sealing area between the seat 11 and ball 50. The closing point whereby fluid stops flowing through the orifice is known as the point of tangent, which can be viewed as having an angle of 0° between the surface of the ball 50 and the seat 11 or an angle of 90° between the normal to the surface of the ball 50 and surface of the seat 11. The point of tangent is the point at which the ball 50 connected to the floating armature 30 meets the solenoid valve opening point or orifice to effect a total closure of fluid flow.

A valve outlet 12 extends from the valve seat to the exterior of the head section 10 of the housing. When the valve ball 50 is sealed against the valve seat 11, no fluid can pass past the valve ball 50 and out of the valve outlet 12. However, when the valve ball 50 is not sealed against the valve seat 11, any fluid that is under pressure inside the valve cavity 21 can flow past the valve ball 50, past the valve seat 11 and through the outlet 12. Such fluid can be supplied to the valve cavity 21 by the valve inlet 22, which is illustrated as an inlet channel in the end of body section 20. As such, it is apparent that fluid entering the valve via the inlet 22 flows past the fixed armature 40, then past the floating armature 30 and spring 80 (and ultimately ball 50) before exiting through the outlet 12.

In order to assist the quiescent passage of the fluid through the valve, the fixed armature 40 and the floating armature 30 are shaped in a way that could be termed "fluted".

Figure 6:
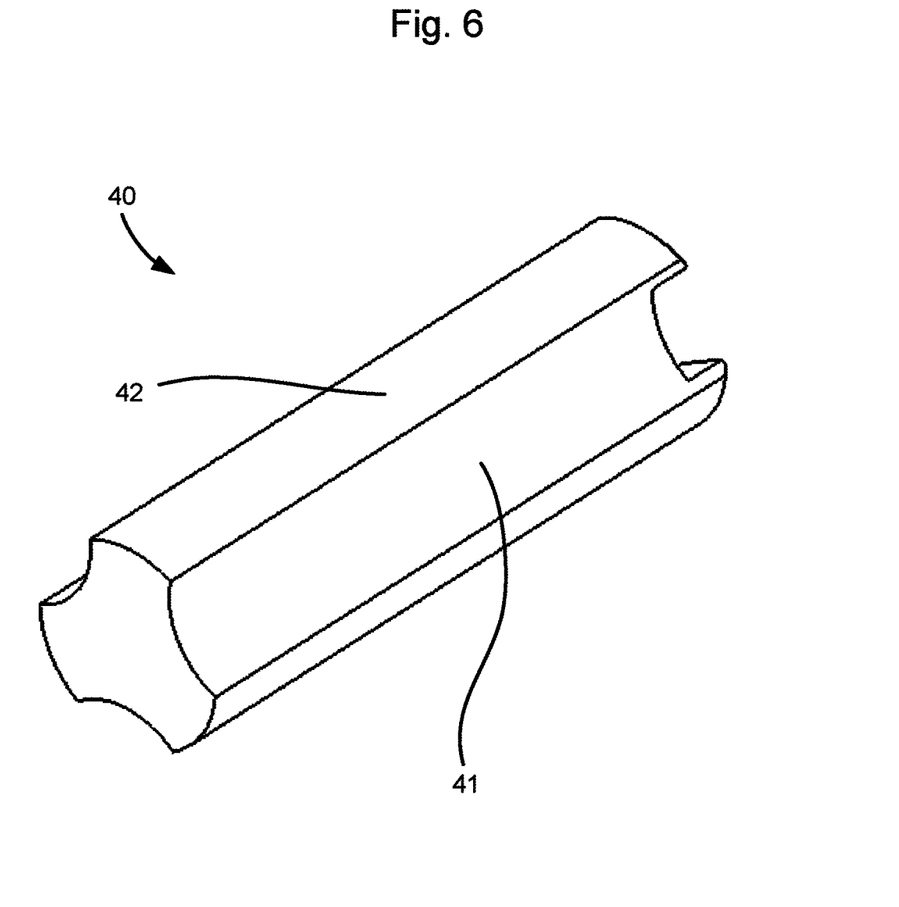
FIG. 6 is a perspective view of the fixed armature shown in FIG. 1.

Considering the fixed armature 40 (shown in detail in FIG. 6), it is substantially cylindrical in shape with three (in the example of FIG. 1) channels symmetrically arranged along the axial surface (i.e. the surface parallel to axis 101, being the surface facing the side wall of the housing body section 20). As such, when viewed in cross-section, the fixed armature 40 has a trefoil shape. That is, the presence of the three channels 41 create three lobes 42 on the armature 40.

The presence of the lobes 42 provides advantages in terms of the actuation of the valve 100. By increasing the shared cross-sectional areas of both the fixed and moving armatures, a more effective electromagnetic circuit is produced when the electromagnetic coil 70 is switched on. As a result, the force acting on the armatures 30 and 40 causes the floating armature to be moved more quickly. This increased force also allows a stronger spring 80 to be used, which makes the valve shut more quickly. This rapid opening and closing gives the valve 100 greater precision and accuracy when dispensing volumes of fluid because there is a greater 'snap' to open and close the valve.

In other embodiments, more than three channels 41 may be present (and thus more than three lobes 42 will also be present). Preferably the channels are arranged symmetrically around the outer surface of the armature 40. Also, the channels 41 are preferably straight, extending from one end to the other of the armature. It is also preferable that the channels extend parallel to the axis 101 extending along the centre line of the micro-valve 100. It is also preferable that the channels 41 are smooth. The absence of sharp contours in the channels 41 helps avoid inducing eddies and turbulence.

As such, the provision of the channels provides ample space for the fluid to flow, and also encourages a laminar flow by ensuring that there is a high surface area to volume ratio in comparison with fluid volume around the armature 40 inside the housing. That is, by dividing the fluid volume into multiple channels, the same volume of fluid can be exposed to a larger surface area, which acts to encourage laminar flow.

This can be considered with reference to the Reynold's number, typically used to characterise whether a flow is turbulent or laminar. A high Reynold's number indicates more turbulent flow, whereas a low Reynolds number is indicative of laminar flow. For pipe and pipe-equivalent flow (such as through a micro-valve), laminar flow is typically characterized by a Reynolds number of 2300 or less. The Reynold's number may be defined as:

$$Re = \frac{pvD_H}{\mu}$$

where $D_H$ (in m) is the hydraulic diameter of the pipe (itself defined as 4 times the cross-sectional area for flow, divided by the length of the wetted perimeter of the flow area), v (in m/s) is the mean velocity of the fluid, p is the fluid density (in $kg/m^3$) and $\mu$ (in Pa·s, $N·s/m^2$ or kg/(m·s) is the dynamic viscosity of the fluid. Therefore, by introducing the fluted structure of the invention, it can be seen that for any given flow area, the wetted perimeter will be increased, thus reducing the hydraulic perimeter and thus reducing the Reynold's number.

In some embodiments the channels 41 may extend in a corkscrew or helix pattern from one end of the armature 40 to the other. This would thus encourage a rotational, but still laminar, flow through the micro-valve 100.

The floating armature 30 is also provided with channels 31, producing lobes 32, in the same way as for the fixed armature 40, and the comments above in connection with the channels 41 of the fixed armature 40 also apply to the channels 31 of the floating armature 30. Once again, the fluted shape provides the same advantages of splitting the fluid flow into smaller fluid channels, with a higher surface area, thereby encouraging laminar flow thereby reducing turbulence and encouraging laminar flow.

The presence of the lobes 32 provide an additional advantage on the floating armature 30. In conventional two-pole armatures (i.e. having a substantially rectangular cross-section), the actuation of the armature typically induces both longitudinal and rotational movement of the armature. One source of rotational movement can be the ends of the spring rotating as it is compressed. The rotational movement can also be caused by inconsistencies in the electromagnetic circuit (for example, due to fluctuating current in the coil 70, or inhomogeneities in the winding of the coil) or, and can result in the two poles of the armature twisting into position according to the strongest components of the field. The twisting motion results in the surround fluid effectively being agitated, with the armature effectively introducing additional turbulence into the flow. By providing three or more lobes, or poles, 32 this effect is reduced. A two-lobe armature could twist up to 90°, however the introduction of additional lobes reduces this twisting because the force acting on the additional lobes help resist a large change in position. As a result, a three lobe armature 30 rotates up to a maximum of 60°. This represents a 30% minimum performance improvement in its own right.

In addition, the floating armature 30 is additionally shaped to provide some further features.

Figure 5:
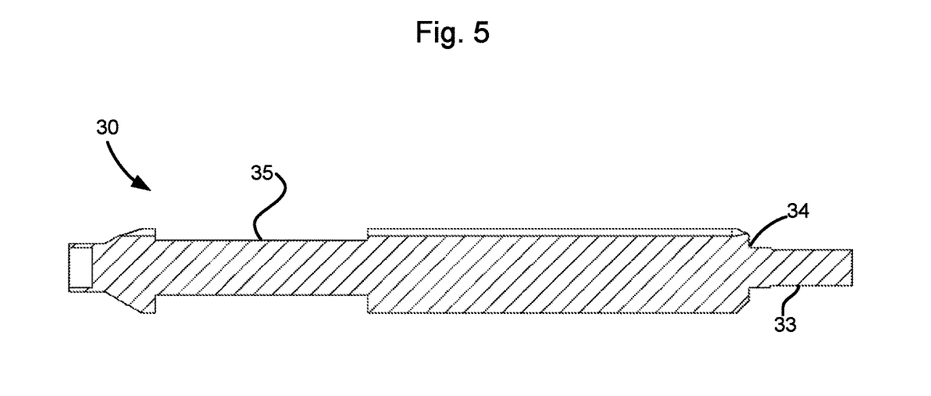
FIG. 5 is a cross sectional view of the armature shown in FIG. 4.

The rear end of the floating armature 30 (the end closes to the fixed armature 40, and opposite to the end bearing the valve ball 50) has a narrow spindle portion, over which the spring 80 can be positioned. The spring 80 acts against recess 34 of the floating armature 30. As can be seen in FIG. 5, the recess is deeper than the channels 31 (as measured inwardly from the housing). In some cases, this will mean the spring 80 can fit inside (in a radial sense) the flow of fluid through the channels of the two armatures 30 and 40. However, even if the spring 80 does, not totally fit inside the flow of fluid through the channels, the exposure of the spring to the bulk fluid flow is reduced. As such, this arrangement means that the spring is not fully located directly in the main flow of fluid through the micro-valve 100 and thus does not cause a significant increase in turbulence of the fluid. Further, by positioning the spring 80 between the two armatures 30 and 40 (as opposed, for example, being positioned in the head section 10) any turbulence that is caused due to the presence of the spring 80 can be reduced by the subsequent flow of the fluid along the channels of the floating armature 30.

The floating armature 30 in the Figures also has an intermediate section 35 of reduced diameter. In section 35 the diameter is reduced to be radially within the channels formed in the rest of the armature 30. This section acts to reduce the overall weight of the armature 30, thus allowing it to be moved more quickly by the solenoid 70 and the spring 80, as required. This assists in providing a fast response and, as a result, the micro-valve can be reliably operated at a high frequency (i.e. the number of on/off cycles per second).

The head 36 of the floating armature 30 has the same fluting creating channels 31 and lobes 32 as present in the intermediate section of the floating armature 30. As such, the front of the floating armature 30 is radially aligned in the valve in the same way as the rear, which also assists in preventing wobbling and keeping the valve ball centred on the valve seat 11. However, the head 36 then tapers towards the front of the armature 30, toward the holder 37 for holding the ball 50.

The ball 50 itself is typically made of a hard material such as ruby or sapphire or ceramic, as is the valve seat 11. This ensures that the valve can perform at a high frequency for an extended period of time without substantial degradation in performance. Using a soft material could result in the valve ball or seat becoming damaged or worn through the repeated actuation of the valve, thus leading to leakage and inaccurate dispensing.

The skilled reader will appreciate that although the valve ball 50 is referred to as a "ball" the shape of the valve ball may not be a sphere. In some embodiments the valve ball 50 may only be hemispherical, or may be some other shapes with a rounded end for meeting the valve seat 11. In some embodiments, the valve ball 50 may be frustoconical.

As mentioned above, the valve seat 11 is preferably made of a hard material such as ceramic or ruby or sapphire. In addition, the aperture size of the outlet is preferably 1.2 mm or less in diameter to enable accurate measurement of small volumes. In preferred embodiments the outlet diameter is 1 mm or less, preferably 0.8 mm or less, more preferably 0.6 mm or less, and still more preferably 0.4 mm or less, and yet more preferably 0.2 mm or less. In preferred embodiments, in which the head section 10 is removable from the body section 20 of the housing, the valve seat and outlet can be exchanged, allowing the micro-valve to be operated with different outlet sizes.

The small outlet size is preferably combined with a small stroke size. The stroke size is the distance between the floating armature 30 and the fixed armature 40 when the valve is closed, which corresponds to the distance moved by the floating armature 30 when the solenoid 70 is turned on. The stroke size can be 1 mm or less, preferably 0.5 mm or less and more preferably 0.2 mm or less. By using a small stroke size, the valve can be opened and closed in a short period of time, thus ensuring that a small amount of liquid is precisely dispensed.

To further assist in the precise metering of small quantities of liquid, the spring 80 has a high stiffness, to ensure that the floating armature 30 is returned to the closed position as quickly as possible when the electric field induced by the solenoid is released. In preferred embodiments the stiffness/Hooke's constant in the range of 40 to 60 mN/mm, preferably about 60 mN/mm. The spring preferably imparts a force in the range of 0.05 to 0.25 N when in use, preferably from 0.10 to 0.20N. The spring is preferably pre-compressed, when assembled, such that it pushes with approximately the same force when the valve is open and closed.

Another advantage of the lobed design of the armatures 30 and 40 is that it provides multiple magnetic poles when the solenoid is turned on. As such, the actuation of the floating armature 30 by the solenoid is also faster and more consistent. The presence of multiple poles, and a large external surface area on both armatures to channel the magnetic field in from the outside, reduces any 'fluttering' of the armature in the magnetic field, which in turn means there is less turbulence in the fluid within the valve. This is assisted by the mechanical guiding effect produced by the presence of multiple channels around the floating armature, making it less susceptible to movement caused by variations/turbulence in any one particular channel. In addition, the material used to make the armature is preferably stainless steel, which is ferrous by nature, but any other suitable ferromagnetic material could be used. The housing is made of a non-magnetic material.

An additional advantage of the design of the present invention is that it is not necessary to use a high pressure in order to obtain fast and precise dispensing. In preferred embodiments, the micro-valve 100 is operated at an internal pressure of around 50 mBar. The low pressure operation also allows for the head section 10 to be removable from the body section 20. In conventional micro-valves operating at high pressure, the micro-valve cannot be dissembled, to ensure that it maintains its integrity at high pressures.

The present invention is not particularly limited by the dimensions of the micro-valve. However, in preferred embodiments the outer diameter of the armatures 30 and 40 are less than 3 mm, preferably less than 2.5 mm and more preferably less than 2.2 mm. The length of the floating armature may be less than 20 mm. The clearance between the maximum radius of the floating armature and the inner ball of the body section 20 is preferably from 0.05 to 0.10 mm. Preferably the clearance is 0.075 mm or less.

In operation, the micro-valve 100 is supplied with fluid via inlet 22. When the valve is closed, the valve ball 50 forms a seal against the valve seat 50, preventing fluid flow out of the valve cavity 21. The floating armature 30, carrying the valve ball 50, is urged towards the valve seat 11 by the spring 80.

When it is desired to dispense the fluid, electric current is supplied to the solenoid 70, inducing a magnetic field in the armatures 30,40. This causes the floating armature 30 to be attracted to the fixed armature 40. The strength of the attraction is enough to overcome the force, in the opposite direction, from the spring and so the floating armature moves towards the fixed armature. This motion further compresses the spring 80 and withdraws the valve ball 50 from the valve seat 11, opening the valve.

When the valve is open, fluid can flow into the valve through the inlet 22, past the fixed armature 40, spring 80 and floating armature 30. The fluted channels in the armatures encourage a quiescent flow of the fluid. Similarly, the tapered head to the floating armature 30 assists in maintaining a laminar flow and avoid unnecessary turbulence. The fluid can then flow past the valve ball 50 and out the outlet 12. Because the flow is controlled and quiescent, sputtering and other outlet effects are minimised, thereby allowing the amount of fluid dispensed to be accurately predicted and controlled.

When it is desired to close the valve, the electric current to the solenoid is turned off (or sufficiently reduced) so that that force from the compressed spring 80 urges the floating armature back towards the valve seat, closing the valve by sealing the valve ball 50 against the valve seat 11 again.

In the embodiments shown in the Figures and described above, the valve is opened by using a solenoid and closed by using a spring. This arrangement has the benefit that, in the absence of an electric current to the solenoid (i.e. in the event of a power failure) the valve remains closed. However, it may be desirable to reverse the actuation, so that the solenoid actively closes the valve and a spring is used to open the valve. In that scenario, a spring would be used in tension (when the solenoid is active) rather than compression, and the ends of the spring would need to be connected to armatures.

The invention claimed is:

1. A micro-valve configured to dispense amounts of fluid in the range of 1 nl to 1 μl comprising:
   a floating armature;
   wherein the floating armature is within a fluid flow path through the micro-valve and comprises a fluted section defining three or more channels extending along the floating armature in a direction of fluid flow;
   a fixed armature within the flow path of a fluid, which comprises three or more channels corresponding to the channels on the floating armature;
   a spring arranged between the floating armature and the fixed armature, radially inwards of the channels on the floating and fixed armatures, at least a portion of the spring being received around a spindle portion of the floating armature, the spindle portion being of a diameter small enough to permit the spring to be at least partially radially recessed relative to the radially-smallest portion of the fluted section of the floating armature;
   a housing carrying the floating armature, fixed armature and spring and comprising a head section removably connected to a body section; and
   a valve outlet provided in the head section of the housing, wherein the outlet has a diameter of 1.2 mm or less;
   wherein the floating armature is configured to move up to 0.5 mm when actuated.

2. A micro-valve according to claim 1, wherein the three or more channels are arranged to be equidistant around the floating armature.

3. A micro-valve according to claim 1, wherein the presence of the channels creates three or more lobes on the floating armature.

4. A micro-valve according to claim 1, wherein the floating armature at least partially tapers in the direction of fluid flow through the micro-valve.

5. A micro-valve according to claim 1, wherein the floating armature has a maximum radius of 1.5 mm or less.

6. A micro-valve according to claim 1, wherein the channels have a maximum depth of at least 0.4 mm.

7. A micro-valve according to claim 1 in which:
   the housing surrounds at least the floating armature; and
   the clearance of the housing from a widest point of the floating armature is 0.100 mm or less.

8. A micro-valve according to claim 1, further comprising:
   an electromagnetic coil for inducing a magnetic field in the floating armature, thereby causing the floating armature to move.

9. A micro-valve according to claim 1, further comprising:
   a valve seat; and
   a valve ball;
   wherein the valve ball is connected to the floating armature, such that movement of the floating armature opens the micro-valve by withdrawing the valve ball from the valve seat and closes the micro-valve by moving the valve ball into the valve seat.

10. A micro-valve according to claim 1, wherein the valve outlet is detachable from the micro-valve.

11. A micro-valve according to claim 8, wherein the floating armature is configured to move up to 0.5 mm when actuated by the electromagnetic coil.

12. A micro-valve according to claim 1, wherein the channels are parallel to an axis of rotational symmetry of the floating armature.

13. A micro-valve according to claim 1, wherein the spring acts against a recess on the floating armature, the recess being deeper than the three or more channels.

14. A method of dispensing fluid using the micro-valve according to claim 1, the micro-valve comprising the floating armature having an axis of rotational symmetry, the floating armature comprising the three or more channels extending in the direction of the axis of rotational symmetry; wherein the method comprises:
   operating the micro-valve to dispense fluid such that fluid passes along the channels of the floating armature.

15. A micro-valve according to claim 1, wherein the floating armature, fixed armature and spring are provided in the body section of the valve housing.

16. A micro-valve according to claim 1, wherein the spring comprises a stiffness/Hooke's constant in the range of 40-60 mN/mm.

17. A micro-valve according to claim 1, wherein the spring is configured to impart a force in the range of 0.05 to 0.25 N.

18. A method of dispensing amounts of fluid in the range of 1 nl to 1 µl using a micro-valve, the method comprising:
   compressing a spring, arranged between a floating armature and a fixed armature of the micro-valve within a housing, wherein:
      the floating armature is within a fluid flow path through the micro-valve and comprises a fluted section defining three or more channels extending along the floating armature in a direction of fluid flow, and
      at least a portion of the spring is received around a spindle portion of the floating armature, the spindle portion being of a diameter small enough to permit the spring to be at least partially radially recessed relative to the radially-smallest portion of the fluted section of the floating armature; and
   releasing the spring, such that it moves the floating armature, which dispenses fluid through a valve outlet provided in a removable head section of the housing.

* * * * *